US010817566B2

(12) United States Patent
Powell et al.

(10) Patent No.: US 10,817,566 B2
(45) Date of Patent: Oct. 27, 2020

(54) SYSTEM AND METHOD FOR AGGREGATING AGENDA INFORMATION FROM LOCAL GOVERNMENT SOURCES

(71) Applicant: LEGIS INC., Dallas, TX (US)

(72) Inventors: Kyla C. Powell, Sacramento, CA (US); Fabio Matsui, Folsom, CA (US); David Smith, Fair Oaks, CA (US); Neil Michel, Davis, CA (US)

(73) Assignee: Legis Inc., Sacramento, CA (US)

( * ) Notice: Subject to any disclaimer, the term of this patent is extended or adjusted under 35 U.S.C. 154(b) by 253 days.

(21) Appl. No.: 15/940,765

(22) Filed: Mar. 29, 2018

(65) Prior Publication Data

US 2019/0303508 A1 Oct. 3, 2019

(51) Int. Cl.
| | | |
|---|---|---|
| G06F 16/901 | (2019.01) |
| G06F 16/93 | (2019.01) |
| G06F 16/907 | (2019.01) |
| G06F 16/955 | (2019.01) |
| G06F 40/205 | (2020.01) |

(52) U.S. Cl.
CPC ........ *G06F 16/9024* (2019.01); *G06F 16/907* (2019.01); *G06F 16/94* (2019.01); *G06F 16/9558* (2019.01); *G06F 40/205* (2020.01)

(58) Field of Classification Search
CPC ............... G06F 16/9024; G06F 40/205; G06F 16/9558; G06F 16/907; G06F 16/94; G06F 17/30
USPC .................................................. 707/738, 740
See application file for complete search history.

(56) References Cited

U.S. PATENT DOCUMENTS

| | | | | |
|---|---|---|---|---|
| 7,181,438 | B1 * | 2/2007 | Szabo | G06F 21/6245 |
| 9,292,575 | B2 * | 3/2016 | Bose | G06F 16/24556 |
| 10,031,978 | B1 * | 7/2018 | Brette | G06F 16/252 |
| 2004/0254919 | A1 | 12/2004 | Giuseppini | |
| 2006/0168515 | A1 | 7/2006 | Dorsett, Jr. | |
| 2008/0281580 | A1 | 11/2008 | Zabokritski | |
| 2010/0332583 | A1 * | 12/2010 | Szabo | G06F 16/248 |
| | | | | 709/202 |
| 2012/0191716 | A1 * | 7/2012 | Omoigui | H01L 27/14647 |
| | | | | 707/740 |
| 2012/0174230 | A1 * | 12/2012 | Belt | G06F 16/951 |

(Continued)

*Primary Examiner* — Shahid A Alam
(74) *Attorney, Agent, or Firm* — Jim H. Salter; Inventive Law Inc.

(57) ABSTRACT

A system and method for aggregating agenda information from local government sources includes: establishing a data connection with a plurality of information resources; fetching raw agenda information from the plurality of information resources, the raw agenda information including a variety of different types or formats of information and documents and related metadata; selecting one of a plurality of parsers to process the raw agenda information, the selected parser configured to process raw agenda information of a particular type or format; using the selected parser to produce a structured and normalized agenda dataset corresponding to the fetched raw agenda information; storing the structured agenda dataset in a normalized document repository; and providing a user interface configured to index structured agenda datasets in the normalized document repository, and to enable users to search content of the structured agenda datasets in the normalized document repository.

20 Claims, 6 Drawing Sheets

(56) References Cited

U.S. PATENT DOCUMENTS

| | | | |
|---|---|---|---|
| 2012/0330946 A1* | 12/2012 | Arredondo | G06F 16/24575 707/728 |
| 2013/0226967 A1* | 8/2013 | Gross | G06Q 10/0633 707/770 |
| 2017/0308797 A1 | 10/2017 | Palombi | |
| 2017/0308976 A1* | 10/2017 | Eidelman | G06F 16/3331 |

\* cited by examiner

SYSTEM AND METHOD FOR AGGREGATING AGENDA INFORMATION FROM LOCAL GOVERNMENT SOURCES

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016-2018 Legis Inc., All Rights Reserved.

TECHNICAL FIELD

This patent application relates to computer-implemented software systems, according to one embodiment, and more specifically to a system and method for aggregating agenda information from local government sources.

BACKGROUND

Local governments must provide public notice of any proposed local laws. Most local governments provide notice over the Internet via public agendas; but, these government entities provide such notice in a wide variety of ways that lack uniformity, consistency, and centralization. This can make tracking and monitoring of local law proposals by interested groups difficult. Some local government entities publish meeting agenda notices in a computer friendly manner like Really Simple Syndication (RSS) feeds; but, the majority of local governments provide unstructured listings in HTML or PDF format via a browser interface. Websites from local government entities can vary wildly. Although local government entities may purchase or subscribe to a few third party website or software vendors, local government entities will often times customize or originate entirely new pages on top of these vendor technologies. Moreover, local governments go through web site redesigns from time to time. Given the number of local jurisdictions, if can be very difficult to handle these website changes on a regular basis.

SUMMARY

In various example embodiments, a system and method for aggregating agenda information from local government sources are disclosed. The agenda information aggregation system of the various embodiments described herein identifies and gathers fragmented agenda information from a variety of local government sources and creates a central data source for local government meeting agendas and other information. This enables interested groups to track local government action on proposed laws.

The various example embodiments described herein improve existing technologies by aggregating, structuring, and normalizing fragmented information from a variety of network-accessible government sources and creating a searchable central data source for local government meeting agendas and other information. Existing technologies have been unable to provide such a structured and searchable data source.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a system and method for aggregating agenda information from local government sources are disclosed. In the various example embodiments described herein, a computer-implemented tool or software application (app) as part of an agenda information aggregation system is described to automate agenda information aggregation from various local government sources, which may provide only fragmented, non-uniform, and decentralized information. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, set-top boxes, consumer electronic devices, or any other type of computing, data processing, communication, networking, or electronic system.

The agenda information aggregation system of the various embodiments described herein identifies and gathers fragmented agenda information from a variety of local government sources or other networked information resources and creates a structured, normalized, and central data source for local government meeting agendas and other information. This enables interested groups to more effectively track local government action on proposed laws. To effectively gather local government agenda information, the example embodiments disclosed herein can obtain, interpret, and even generate the metadata related to the collected information and documents.

Figure 1:
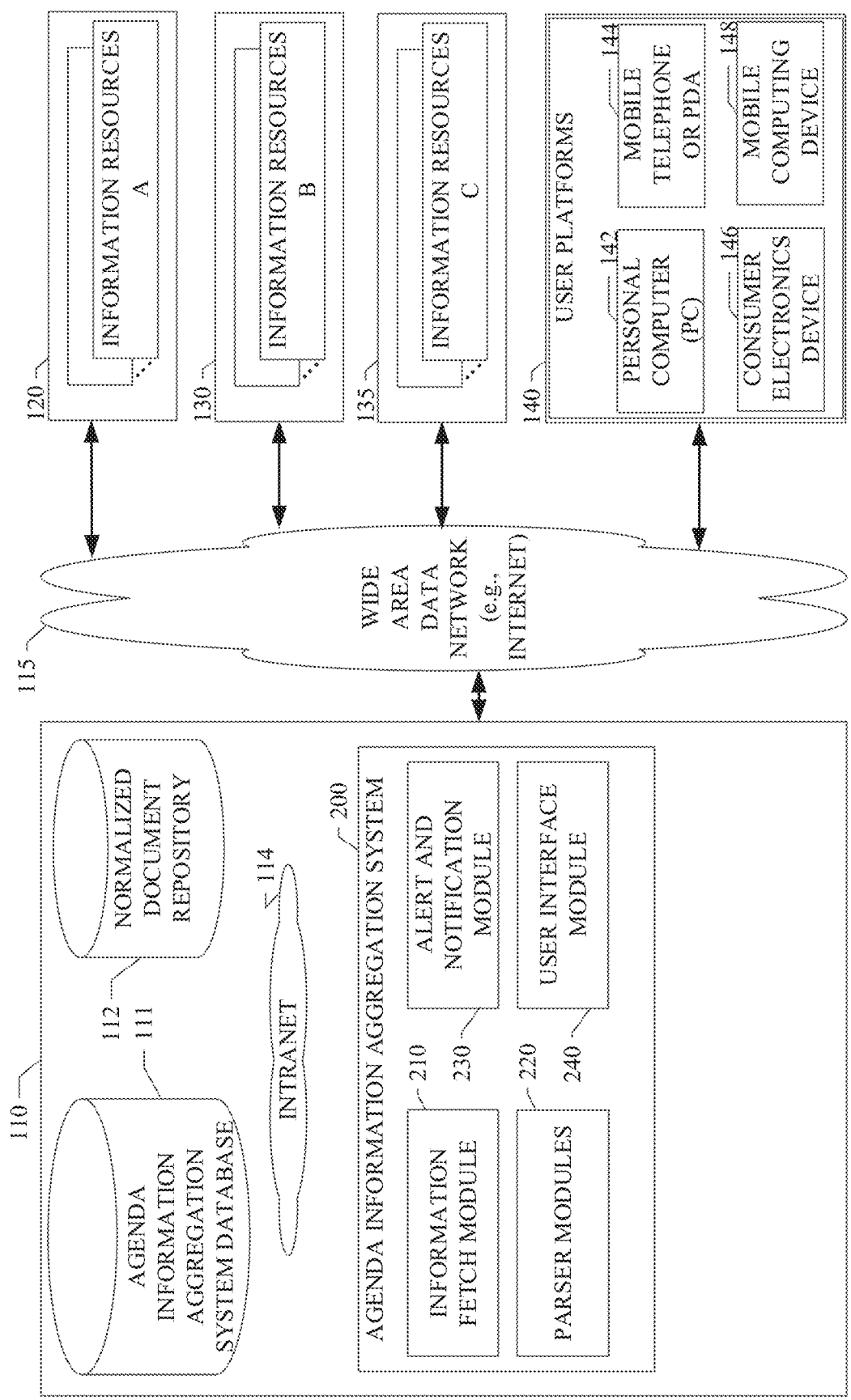
FIG. 1 illustrates an example embodiment of a networked system in which various embodiments may operate.

Referring now to FIG. 1 for an example embodiment, a system for aggregating agenda information from local government sources is illustrated. In various example embodiments, an application or service, typically provided by or operating on a host site (e.g., a website) 110, is provided to simplify and facilitate the downloading or hosted use of the agenda information aggregation system 200 of an example embodiment. In a particular embodiment, the agenda information aggregation system 200 can be downloaded from the host site 110 by a user at a user platform 140. Alternatively, the agenda information aggregation system 200 can be hosted by the host site 110 for a networked user at a user platform 140. The details of the agenda information aggregation system 200 for an example embodiment are provided below.

Referring again to FIG. 1, the agenda information aggregation system 200 can be in network communication with a plurality of information resources A 120, information resources B 130, and/or information resources C 135. The information resources A, B, and C 120/130/135 can include websites or other network resources at which information is available regarding government action, agendas, meetings, public hearings, legislative proposals, executive proposals, administrative proposals, and the like (generally denoted herein as agenda information). The agenda information aggregation system 200 can be configured to obtain this agenda information in a digital or computer-readable form via the network 115 from the information resources A, B, and C 120/130/135. The agenda information aggregation system 200 can be in network data communication with the information resources A, B, and C 120/130/135 via the network 115.

One or more of the information resources A, B, and C 120/130/135 can be provided by one or more government entities or third party providers operating at various locations in a network ecosystem. It will be apparent to those of ordinary skill in the art that information resources A, B, and C 120/130/135 can be any of a variety of networked government or third party information providers or on-line information providers as described in more detail below. In a particular embodiment, a resource list maintained at the host site 110 can be used as a summary or list of all information resources A, B, and C 120/130/135, which users or the host site 110 may visit/access and from which users or the host site 110 can obtain agenda information. The host site 110, information resources A 120, information resources B 130, information resources C 135, and user platforms 140 may communicate and transfer data and information in the data network ecosystem shown in FIG. 1 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The information resources A 120, information resources B 130, and/or the information resources C 135 may include any of a variety of providers of network transportable digital data. The network transportable digital data can be transported in any of a family of file formats and associated mechanisms usable to enable a host site 110 and a user platform 140 to receive agenda information over the network 115. In example embodiments, the file format can be a Hypertext Markup Language (HTML) format, a plain text format, Microsoft™ Excel spreadsheet format, or a CSV (Comma Separated Values) format; however, the various embodiments are not so limited, and other file formats and transport protocols may be used. For example, data formats other than HTML, text, Excel, or CSV or formats other than open/standard formats can be supported by various embodiments. Any electronic file format, such as Microsoft™ Access Database Format (MDB), Portable Document Format (PDF), audio (e.g., Motion Picture Experts Group Audio Layer 3—MP3, and the like), video (e.g., MP4, and the like), and any proprietary interchange format defined by specific sites can be supported by the various embodiments described herein. Moreover, information resources A, B, and C 120/130/135 may provide a variety of different data sets or data formats.

In a particular embodiment, a user platform 140 with one or more client devices enables a user to access data provided by the agenda information aggregation system 200 via the host 110 and network 115. Client devices of user platform 140 may include virtually any computing device that is configured to send and receive information over a network, such as network 115. Such client devices may include portable devices 144, such as, cellular telephones, smartphones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The client devices may also include other computing devices, such as personal computers 142, multiprocessor systems, microprocessor-based or programmable consumer electronics, network PC's, and the like. The client devices may also include other processing devices, such as consumer electronic (CE) devices 146 and/or mobile computing devices 148, which are known to those of ordinary skill in the art. As such, the client devices of user platform 140 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a full screen color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The client devices of user platform 140 may also include at least one client application that is configured to receive agenda information and/or control data from another computing device via a wired or wireless network transmission. The client application may include a capability to provide and receive textual data, graphical data, video data, audio data, and the like. Moreover, client devices of user platform 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 1, the agenda information aggregation system 200 for an example embodiment is shown to include an agenda information aggregation system database 111 and a normalized document repository 112. The database 111 can be used to retain a variety of information data sets including, but not limited to, agenda information, information resource information, metadata, parser configuration information, agenda and resource analytics, and the like. The database 112 can be used to retain a variety of information data sets including, but not limited to, agenda information, structured and normalized representations of parsed agenda information, documents, document links, document lists, and the like. It will be apparent to those of ordinary skill in the art that the agenda information aggregation system database 111 and normalized document repository 112 can be locally resident at the host site 110 or remotely located at other server locations or stored in network cloud storage.

Referring again to FIG. 1, host site 110 of an example embodiment is shown to include the agenda information aggregation system 200. In an example embodiment, agenda information aggregation system 200 can include an information fetch module 210, parser modules 220, an alert and notification module 230, and a user interface module 240. Each of these modules can be implemented as software components executing within an executable environment of agenda information aggregation system 200 operating on host site 110 or user platform 140. Each of these modules of an example embodiment is described in more detail below in connection with the figures provided herein.

Figure 2:
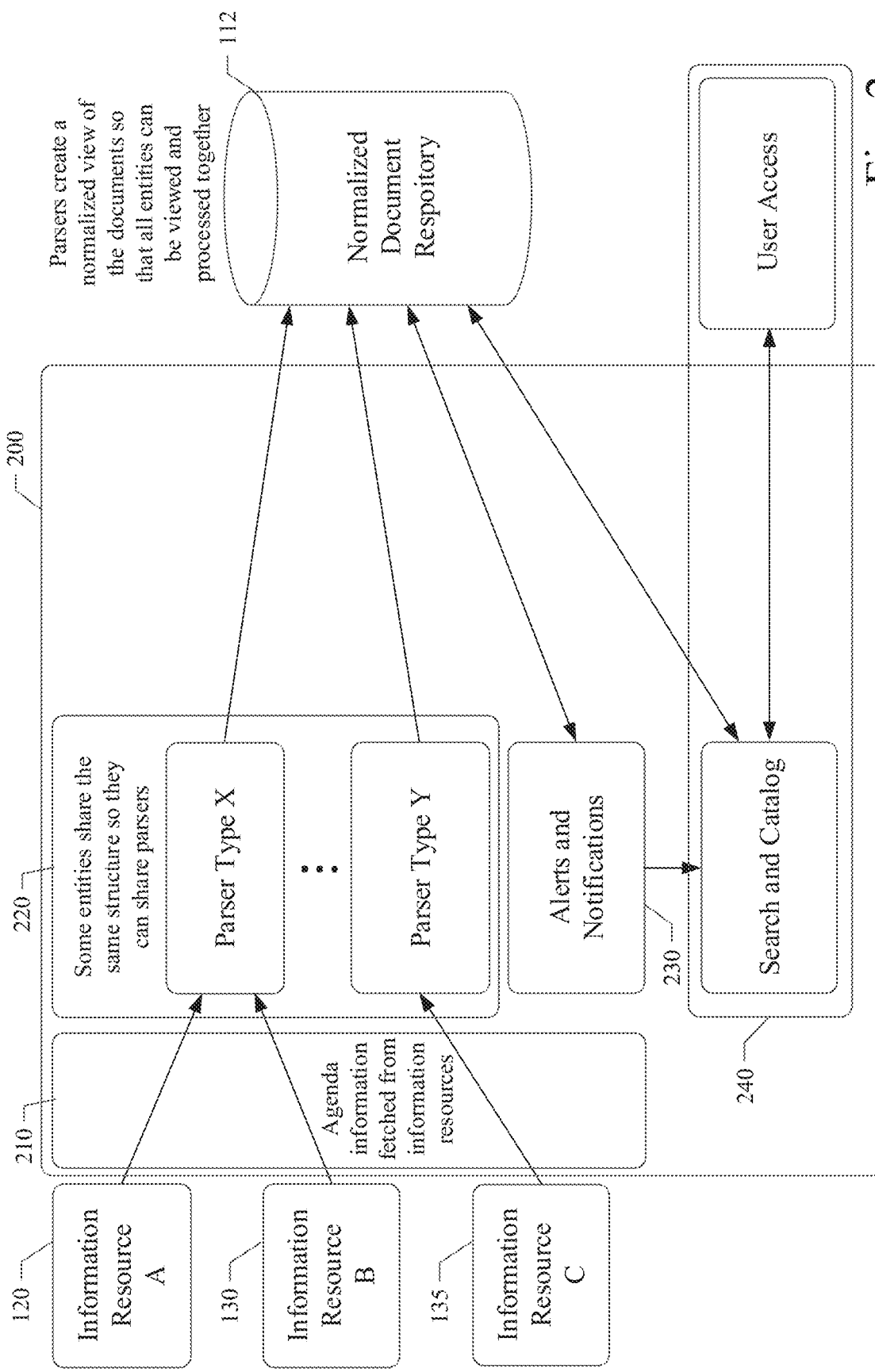
FIG. 2 illustrates a high level system structure of an example embodiment.

FIG. 2 illustrates a high level system structure of an example embodiment. Referring now to FIGS. 1 and 2, the agenda information aggregation system 200 can include an information fetch module 210. The information fetch module 210 can be configured to perform the processing as described herein. Initially, the information fetch module 210 can be configured to establish, by use of a data processor and the data network 115, a data connection with at least one information resource 120/130/135. Additionally, the information fetch module 210 can be configured to identify documents, data streams, videos, or other information provided by the information resources 120/130/135, such as government websites, databases, libraries, and the like. The information fetch module 210 can be configured to download, retrieve, scrape, or otherwise obtain raw agenda information from these information resources 120/130/135. Alternatively, a representative of the host 110 can make agreements with the information resources 120/130/135 to enable the host 110 to obtain the agenda information directly from the information resources 120/130/135 by use of a pre-established account/password and/or application programming interface (API) data communications.

The information fetch module 210 can be configured to periodically fetch a variety of different types or formats of information and documents and related metadata from the information resources 120/130/135. In an example embodiment, the information and document collection process can include obtaining documents themselves and the related document metadata. Metadata can include a title, local entity name, department, document type, and publication date, among other information. Importantly, many or most information resources 120/130/135 also publish a list of documents that are available on a particular site or within a particular entity. The typical document list includes references to the individual documents, their titles, dates, document types, and links to the actual documents, among other information. In an example embodiment, the information fetch module 210 can be configured to fetch the list of documents available from one or more of the information resources 120/130/135. The information fetch module 210 can be configured to determine that the fetched document is a document list based on the content and structure of the document list. The content of the document list can be used by the information fetch module 210 to generate relevant metadata corresponding to other documents or information obtained from a particular information resource 120/130/135. Upon determining that the fetched document is a document list, the information fetch module 210 can be configured to select a particular parser of parsers 220, which is pre-configured for parsing document lists as described in more detail below. Additionally, the information fetch module 210 can be configured to extract the document links from the document list and fetch the linked or referenced documents themselves. In this manner, the information fetch module 210 can be configured to directly fetch documents or information from one or more of the information resources 120/130/135, generate metadata from fetched document lists, and indirectly fetch linked documents or information from information resources 120/130/135. In one embodiment, a host business expert can identify particular Uniform Resource Locators (URLs) from which the information fetch module 210 can fetch documents, document lists, or information. In other embodiments, the information fetch module 210 can be configured to perform network searches using a pre-defined set of search keywords. The search results can be processed to extract likely relevant links, URLs, or other site identifiers corresponding to the information resources 120/130/135. In other embodiments, the information fetch module 210 can be configured to use machine learning processes to learn the characteristics of likely relevant documents and information and identify the sources of such information or documents.

As a result, the information fetch module 210 can be configured to gather a variety of raw agenda information, including documents and document lists, from the various information resources 120/130/135. The raw agenda information is typically retrieved from the information resources 120/130/135 by the information fetch module 210 in a variety of differing formats, structured and unstructured, and with inconsistent and incomplete content. As such, the raw fetched agenda information needs to be processed, structured, and normalized for storage in a searchable document and information database 112.

Referring still to FIGS. 1 and 2, the agenda information aggregation system 200 can include parser modules 220. The parser modules 220 can be configured to perform the processing as described herein. The parser modules 220 can be configured to process a particular type or format of raw agenda information obtained from an information resource 120/130/135 by the information fetch module 210. Each of the parser modules of the parser modules 220 can be configured to process a different type or format of raw agenda information or a differently structured document of the raw agenda information. In one embodiment, the information fetch module 210 can interpret the metadata for an item of the fetched raw agenda information to determine the type or format of information or document. In another embodiment, a host business expert can analyse the HTML or other related information for the fetched raw agenda information or a fetched document list and select an appropriate parser of parsers 220 to process the particular type or format of raw agenda information or document list. The host business expert can also develop or configure any custom adjustments needed for a particular parser of parsers 220. The host business expert can also register an identifier of a particular information resource 120/130/135 (e.g., a site URL) and the associated parser of parsers 220 as a configurable element of the agenda information aggregation system 200.

Figure 3:
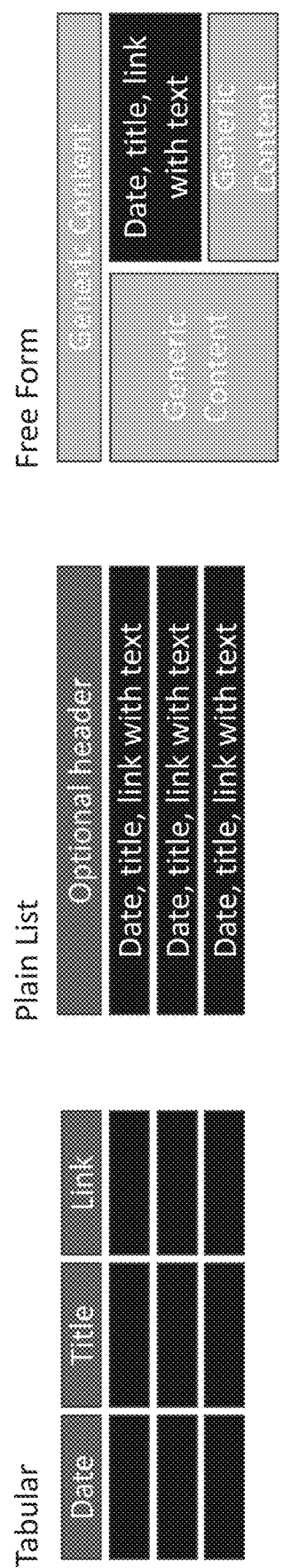
FIG. 3 illustrates samples of various types of information formats and corresponding parsers used in example embodiments.

Referring now to FIG. 3, samples illustrate various types of information formats and corresponding parsers used in example embodiments. For example, raw agenda data can be configured in a tabular format in a basic row and column form. In this case, a corresponding parser of parsers 220 can break the tabular format and extract a header row to determine the attributes of each column of the tabular format. These attributes can be used to structure the resulting dataset into a normalized dataset.

In a second example shown in FIG. 3, the raw agenda data can be configured in a plain list format without columns. In this case, a corresponding parser of parsers 220 can break the plain list format, extract row content, and parse the content using regular expressions and code to determine the attributes of the row content. These attributes can be used to structure the resulting dataset into a normalized dataset.

In a third example shown in FIG. 3, the raw agenda data can be configured in a free form or unstructured format. In this case, a corresponding parser of parsers 220 is specially configured or generated to break the free form or unstructured format and extract data item content. This data item content can be used to structure the resulting dataset into a normalized dataset.

Referring again to FIGS. 1 and 2, upon determining that the fetched information or document is of a particular type, format, or structure, the information fetch module 210 can be configured to select a particular parser of parsers 220, which is pre-configured for parsing the information or document of the particular type, format, or structure. Having determined and selected the appropriate parser of parsers 220, the information fetch module 210 can be configured to pass the fetched information or document of the particular type, format, or structure to the selected parser for further processing. The selected parser of parsers 220 can receive the fetched information or document of the particular type, format, or structure and parse the information or document accordingly. As a result, the selected parser can produce a structured and normalized set of information (denoted herein as a structured agenda dataset) corresponding to the received information or document of the particular type, format, or structure. In particular, the selected parser can extract agenda information, scheduling information, topic or subject matter identifiers, identifiers of particular regulations, proposed laws, bills, meeting agendas, and the like that may be within the content of the parsed information or documents. The selected parser can be configured to structure and normalize this information into a searchable structured agenda dataset for storage in the normalized document repository 112. As described in more detail below, these structured and normalized agenda datasets can be conveniently searched and cataloged by and for users of user platforms 140 by use of a user interface.

As described above, the information fetch module 210 can also fetch and process document lists from the information resources 120/130/135. Upon determining that the fetched document is a document list, the information fetch module 210 can be configured to select a particular parser of parsers 220, which is pre-configured for parsing document lists. The one or more particular parsers configured to parse document lists can extract metadata and document links from the document list. The metadata can be used by the parser and/or the information fetch module 210 to generate additional metadata related to documents or information in the normalized document repository 112. These metadata and links can be added to the corresponding structured and normalized agenda datasets stored in the document repository 112.

Referring again to FIGS. 1 and 2, the agenda information aggregation system 200 can include an alert and notification module 230. The alert and notification module 230 can be configured to perform the processing as described herein. In particular, the alert and notification module 230 can be configured to programmatically generate user alerts and notifications based on the structured agenda information stored in the normalized document repository 112. For example, as described above, parsers 220 can extract agenda information, scheduling information, topic or subject matter identifiers, identifiers of particular regulations, proposed laws, bills, meeting agendas, and the like that may be within the content of the parsed information or documents. The parsers 220 can store this data as structured agenda datasets in normalized document repository 112. The alert and notification module 230 can periodically query these structured agenda datasets in the normalized document repository 112 and determine the dates and times of events related to particular topics of interest to users. Users can subscribe to receive alerts and notifications related to particular topics. The alert and notification module 230 can match event information extracted from the structured agenda datasets with subscribing users and send alerts or notifications to these users via the user interface provided by the user interface module 240.

Referring still to FIGS. 1 and 2, the agenda information aggregation system 200 can include a user interface module 240. The user interface module 240 can be configured to perform the processing as described herein. As described above, the agenda information aggregation system 200 can be configured to extract structured and normalized information content from fetched documents and to add the extracted information content to the corresponding structured and normalized agenda datasets stored in the document repository 112. A search engine of the user interface module 240 can be configured to index the structured agenda datasets in the normalized document repository 112, which can be searched by users via a user interface provided by the user interface module 240 on a rendering device of a user platform 140. The user interface module 240 can also be configured to generate and/or provide a catalog of content in the structured and normalized agenda datasets stored in the document repository 112. The content catalog can provide various categories of the structured agenda dataset content, such as topic, source entity, date/time, regulation or legislation identifier, meeting agenda identifiers, and the like. The user interface module 240 can be further configured to provide a user interface to enable a user to subscribe to one or more alerts or notifications provided by the alert and notification module 230. Thus, the agenda information aggregation system 200 of the various embodiments described herein can identify and gather fragmented agenda information from a variety of local government sources and create a central structured and normalized data source for local government information. This enables interested groups to track local government action on proposed laws.

Figure 4:
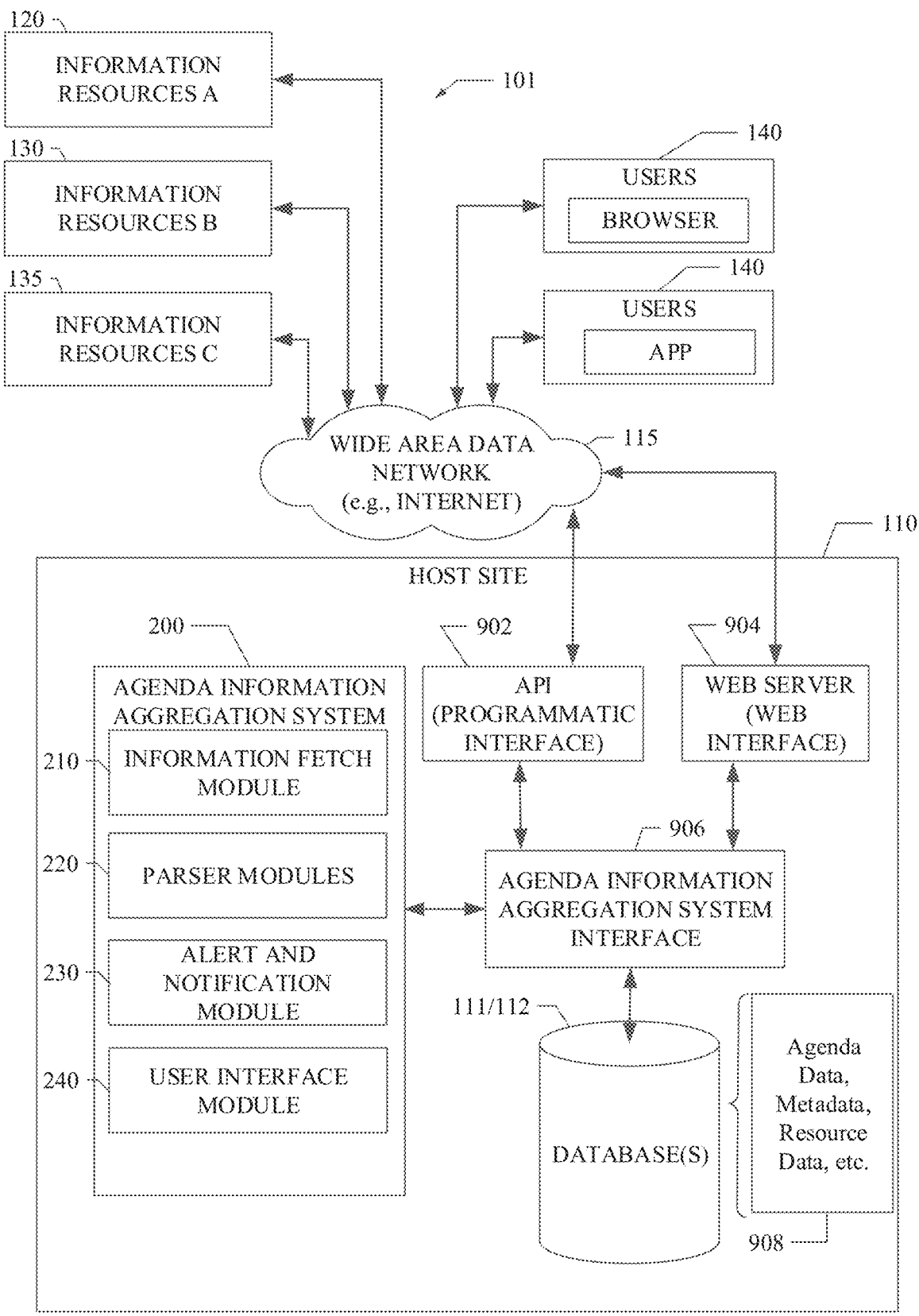
FIG. 4 illustrates another example embodiment of a networked system in which various embodiments may operate.

Referring now to FIG. 4, another example embodiment 101 of a networked system in which various embodiments may operate is illustrated. In the embodiment illustrated, the host site 110 is shown to include the agenda information aggregation system 200. The agenda information aggregation system 200 is shown to include the functional components 210-240, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the agenda information aggregation system 200 either directly or via an interface 906. The agenda information aggregation system 200 may be configured to access data storage devices 111/112 either directly or via the interface 906.

Figure 5:
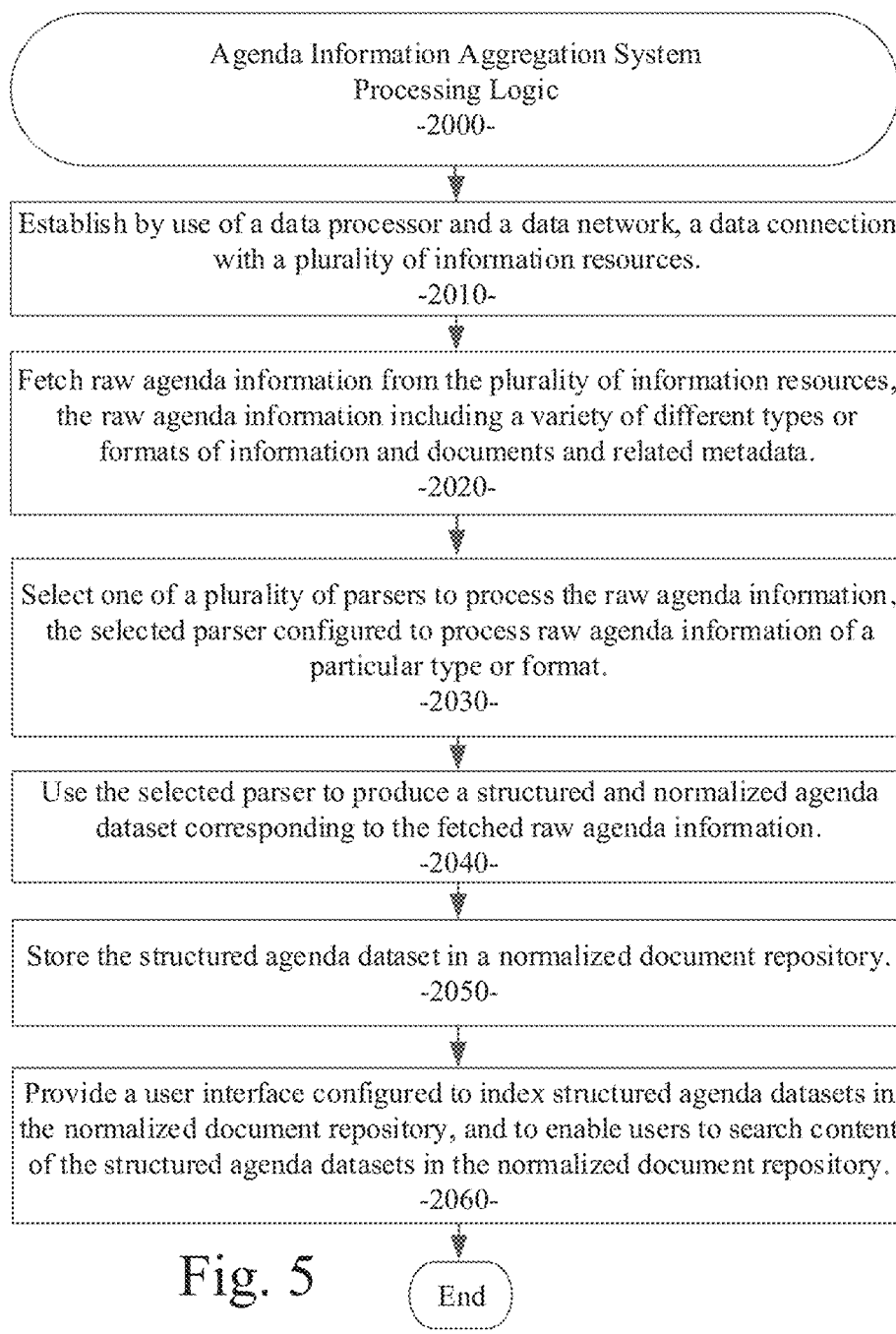
FIG. 5 illustrates a processing flow diagram that illustrates an example embodiment of a method as described herein.

Referring now to FIG. 5, a processing flow diagram illustrates an example embodiment of a method implemented by the agenda information aggregation system 200 as described herein. The method 2000 of an example embodiment includes: establishing, by use of a data processor and a data network, a data connection with a plurality of information resources (processing block 2010); fetching raw agenda information from the plurality of information resources, the raw agenda information including a variety of different types or formats of information and documents and related metadata (processing block 2020); selecting one of a plurality of parsers to process the raw agenda information, the selected parser configured to process raw agenda information of a particular type or format (processing block 2030); using the selected parser to produce a structured and normalized agenda dataset corresponding to the fetched raw agenda information (processing block 2040); storing the structured agenda dataset in a normalized document repository (processing block 2050); and providing a user interface configured to index structured agenda datasets in the normalized document repository, and to enable users to search content of the structured agenda datasets in the normalized document repository (processing block 2060).

Figure 6:
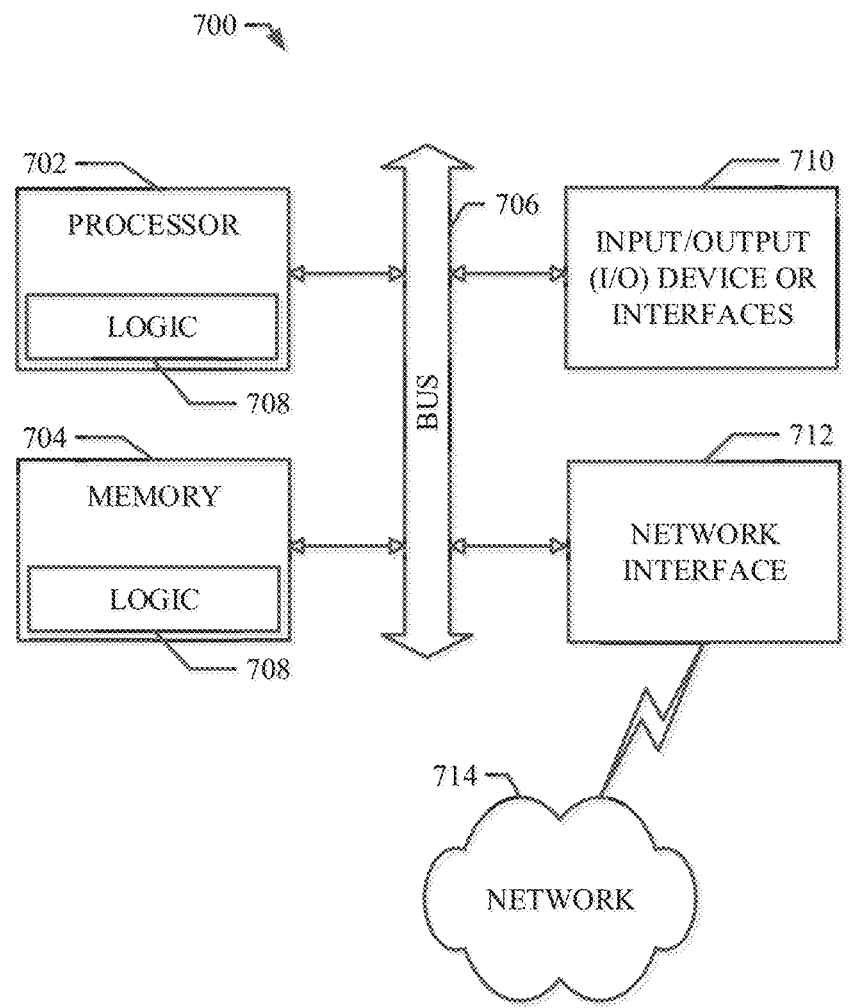
FIG. 6 shows a diagrammatic representation of a machine in the example form of a computer system within which a set of instructions when executed may cause the machine to perform any one or more of the methodologies discussed herein.

FIG. 6 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for aggregating agenda information from local government sources are disclosed. In various embodiments, a software application program is used to enable the development and presentation of agenda information for users on the display screen of a computing or communication system, including mobile devices. As described above, in a variety of contexts, the agenda information aggregation system 200 of an example embodiment can be configured to automatically obtain a variety of information from one or more 3$^{rd}$ party sites via a data network to facilitate the user experience of searching, filtering, sorting, and consuming agenda information, all from the convenience of a portable electronic device, such as a smartphone. This collection of agenda information has traditionally been possible only via multiple, personal interactions with a plurality of different parties at different locations. The embodiments as presently disclosed and claimed enable these disparate transactions to be integrated and structured into a single set of electronic interactions with a mobile device or other computing device. As such, the various embodiments as described herein are necessarily rooted in computer and network technology and serve to improve these technologies when applied in the manner as presently claimed. In particular, the various embodiments described herein improve the use of mobile device technology and data network technology in the context of agenda information transactions via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method for aggregating agenda information from local government sources, the method comprising:

establishing, by use of a data processor and a data network, a data connection with a plurality of information resources;

fetching raw agenda information from the plurality of information resources, the raw agenda information including a variety of different types or formats of information and documents and related metadata;

accessing metadata for an item of the fetched raw agenda information to determine a type or format of information or document corresponding to the item of the fetched raw agenda information;

selecting one of a plurality of parsers to process the raw agenda information, the selected one of the plurality of parsers processing the determined type or format of information or document corresponding to the item of the fetched raw agenda information, the selected parser processing raw agenda information of a particular type or format, each parser of the plurality of parsers being a separate executable module with a configurable registered identifier;

using the selected parser to produce a structured and normalized agenda dataset corresponding to the fetched raw agenda information;

storing and then indexing the structured agenda dataset in a normalized document repository;

enabling users to search content of the structured agenda datasets in the normalized document repository; and presenting aggregated agenda information from local government sources to users in response to search requests.

2. The method of claim 1 wherein the fetched raw agenda information includes a document list.

3. The method of claim 2 including using content of the document list to generate metadata.

4. The method of claim 2 including using content of the document list to extract document links from the document list and to fetch the linked or referenced documents.

5. The method of claim 1 including enabling the users to subscribe to a particular alert or notification.

6. The method of claim 1 including sending an alert or notification to a subscribing user.

7. The method of claim 1 including generating a catalog of content in the normalized document repository.

8. A system for aggregating agenda information from local government sources, the system comprising:

a data processor;
a network interface, in data communication with the data processor, for communication on a data network; and
an agenda information aggregation system, executable by the data processor, to:
 establish, by use of the data processor and the data network, a data connection with a plurality of information resources;
 fetch raw agenda information from the plurality of information resources, the raw agenda information including a variety of different types or formats of information and documents and related metadata;
 access metadata for an item of the fetched raw agenda information to determine a type or format of information or document corresponding to the item of the fetched raw agenda information;
 select one of a plurality of parsers to process the raw agenda information, the selected one of the plurality of parsers processing the determined type or format of information or document corresponding to the item of the fetched raw agenda information, the selected parser processing raw agenda information of a particular type or format, each parser of the plurality of parsers being a separate executable module with a configurable registered identifier;
 use the selected parser to produce a structured and normalized agenda dataset corresponding to the fetched raw agenda information;
 store and then index the structured agenda dataset in a normalized document repository;
 enable users to search content of the structured agenda datasets in the normalized document repository; and
 present aggregated agenda information from local government sources to users in response to search requests.

9. The system of claim 8 wherein the fetched raw agenda information includes a document list.

10. The system of claim 9 being further configured to use content of the document list to generate metadata.

11. The system of claim 9 being further configured to use content of the document list to extract document links from the document list and to fetch the linked or referenced documents.

12. The system of claim 8 being further configured to enable the users to subscribe to a particular alert or notification.

13. The system of claim 8 being further configured to send an alert or notification to a subscribing user.

14. The system of claim 8 being further configured to generate a catalog of content in the normalized document repository.

15. A non-transitory machine-useable storage medium embodying instructions for aggregating agenda information from local government sources, the instructions which, when executed by a machine, cause the machine to:
 establish, by use of the data processor and the data network, a data connection with a plurality of information resources;
 fetch raw agenda information from the plurality of information resources, the raw agenda information including a variety of different types or formats of information and documents and related metadata;
 access metadata for an item of the fetched raw agenda information to determine a type or format of information or document corresponding to the item of the fetched raw agenda information;
 select one of a plurality of parsers to process the raw agenda information, the selected one of the plurality of parsers processing the determined type or format of information or document corresponding to the item of the fetched raw agenda information, the selected parser processing raw agenda information of a particular type or format, each parser of the plurality of parsers being a separate executable module with a configurable registered identifier;
 use the selected parser to produce a structured and normalized agenda dataset corresponding to the fetched raw agenda information;
 store and then index the structured agenda dataset in a normalized document repository;
 enable users to search content of the structured agenda datasets in the normalized document repository; and
 present aggregated agenda information from local government sources to users in response to search requests.

16. The non-transitory machine-useable storage medium of claim 15 wherein the fetched raw agenda information includes a document list.

17. The non-transitory machine-useable storage medium of claim 16 being further configured to use content of the document list to generate metadata.

18. The non-transitory machine-useable storage medium of claim 16 being further configured to use content of the document list to extract document links from the document list and to fetch the linked or referenced documents.

19. The non-transitory machine-useable storage medium of claim 15 being further configured to enable the users to subscribe to a particular alert or notification.

20. The non-transitory machine-useable storage medium of claim 15 being further configured to send an alert or notification to a subscribing user.

\* \* \* \* \*